(12) United States Patent
Epstein et al.

(10) Patent No.: US 6,789,188 B1
(45) Date of Patent: Sep. 7, 2004

(54) METHODS AND APPARATUS FOR SECURE CONTENT DISTRIBUTION

(75) Inventors: Michael A. Epstein, Spring Valley, NY (US); Martin Rosner, Hasting-on-Hudson, NY (US); Toine A. M. Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/498,883

(22) Filed: Feb. 7, 2000

(51) Int. Cl.[7] .................................................. H04L 9/30
(52) U.S. Cl. ............................ 713/155; 705/1; 705/4; 705/51
(58) Field of Search ........................... 713/155; 705/1, 705/4, 51

(56) References Cited

U.S. PATENT DOCUMENTS

| | | | |
|---|---|---|---|
| 5,524,201 A | * 6/1996 | Shwarts et al. | ............. 345/763 |
| 5,745,574 A | 4/1998 | Muftic | ......................... 380/23 |
| 5,765,152 A | * 6/1998 | Erickson | ....................... 707/9 |

FOREIGN PATENT DOCUMENTS

| | | | |
|---|---|---|---|
| DE | 19518546 | 5/1995 | ............. H04L/9/00 |
| WO | WO9839878 | 9/1998 | ............. H04L/9/32 |

OTHER PUBLICATIONS

Bruce Schneier, Applied Cryptography, 1996, John Wiley & Sons, Second Edition, p. 38–39.*
Bruce Schneier, Applied Cryptography, 1996, John Wiley & Sons, Second Edition, p. 38–39.*
ISO 2108, International Standard Book Numbering, 1992, Third Edition.*
International Serial Nubering Standard, ISSN , 1995.*

* cited by examiner

Primary Examiner—Gregory Morse
Assistant Examiner—Thomas Ho
(74) Attorney, Agent, or Firm—Edward W. Goodman

(57) ABSTRACT

Methods and apparatus for secure distribution of music and other types of content. The invention allows content to be registered with a centralized trusted registration authority (TRA) in such a way that it can be distributed anonymously, such that the identity of the content provider need not be disclosed until a dispute arises. A first illustrative embodiment of the invention provides unbound rights management, i.e., secure registration of content such that usage rights for the content are not bound to the content itself. In this embodiment, distributed content is not protected by encryption, i.e., confidentiality of content is not provided. However, the content is protected against piracy, due to the fact that the content provider is certified by the TRA, and thus can be traced or otherwise identified in the event that irregularities are detected. Since the usage rights are not bound to the content, the content provider can change the usage rights after the content has been registered with the TRA. Content distribution in second and third illustrative embodiments of the invention provides unbound and bound rights management, respectively, with encryption-based content confidentiality.

21 Claims, 18 Drawing Sheets

METHODS AND APPARATUS FOR SECURE CONTENT DISTRIBUTION

FIELD OF THE INVENTION

The present invention relates generally to the field of secure communication, and more particularly to techniques for secure electronic distribution of music and other types of content over a network or other communication medium.

BACKGROUND OF THE INVENTION

Security is an increasingly important concern in the delivery of music or other types of content over global communication networks such as the Internet. More particularly, the successful implementation of such network-based content delivery systems depends in large part on ensuring that content providers receive appropriate copyright royalties and that the delivered content cannot be pirated or otherwise subjected to unlawful exploitation.

With regard to delivery of music content, a cooperative development effort known as Secure Digital Music Initiative (SDMI) has recently been formed by leading recording industry and technology companies. The goal of SDMI is the development of an open, interoperable architecture for digital music security. This will answer consumer demand for convenient accessibility to quality digital music, while also providing copyright protection so as to protect investment in content development and delivery. SDMI has already produced a standard specification for portable music devices, the SDMI Portable Device Specification, Part 1, Version 1.0, 1999. The longer-term effort of SDMI is currently working toward completion of an overall architecture for delivery of digital music in all forms.

Despite SDMI and other ongoing efforts, existing techniques for secure distribution of music and other content suffer from a number of significant drawbacks. For example, many such techniques require that the content provider be explicitly identified to the content consumer upon delivery of the content, i.e., these techniques generally do not allow the content provider to remain completely anonymous in the absence of a dispute. Unfortunately, this type of arrangement may not be desirable or cost-effective in certain applications, particularly for content providers that are individuals or small businesses. As another example, conventional techniques generally do not provide a centralized mechanism by which all content providers can securely register their work. Content providers are therefore not treated equally under these existing techniques, i.e., larger providers who can afford the expense associated with implementation of complex security measures have an advantage over smaller providers.

As is apparent from the above, a need exists for improved techniques for distributing SDMI-compliant music and other types of content.

SUMMARY OF THE INVENTION

The present invention provides methods and apparatus for secure distribution of music and other types of content. The invention allows content to be registered with a centralized trusted registration authority (TRA) in such a way that it can be distributed anonymously, such that the identity of the content provider need not be disclosed until a dispute arises.

Content distribution in a first illustrative embodiment of the invention is implemented in accordance with a content distribution protocol which provides unbound rights management, i.e., secure registration of content such that usage rights for the content are not bound to the content itself. In this embodiment, distributed content is not protected by encryption, i.e., confidentiality of content is not provided. However, the content is protected against piracy, due to the fact that the content provider is certified by the TRA, and thus can be traced or otherwise identified in the event that irregularities are detected. Since the usage rights are not bound to the content, the content provider can change the usage rights after the content has been registered with the TRA. Content distribution in second and third illustrative embodiments of the invention is implemented in accordance with content distribution protocols which provide unbound and bound rights management, respectively, with encryption-based content confidentiality.

Advantageously, the content distribution methods and apparatus of the invention can provide convenient, efficient and cost-effective protection for all content providers. These and other features and advantages of the present invention will become more apparent from the accompanying drawings and the following detailed description.

DETAILED DESCRIPTION OF THE INVENTION

The present invention allows music or any other form of content to be registered in such a way that it can be distributed anonymously. The content distribution methods described below allow content providers to register their content with a trusted authority prior to its distribution, thereby allowing the content to be distributed from the content provider to a content consumer in such a way that the content provider need not be disclosed until a dispute arises. Advantageously, the content distribution methods of the invention can provide convenient, efficient and cost-effective protection for all content providers.

Three illustrative embodiments of the invention will be described below, each corresponding to a particular protocol that implements the above-described functionality. The protocols vary in the level of security and control given to the content provider. In the following description, an operation E[K][S] denotes encryption of the quantity S in brackets using the key K, and an operation D{K}[S] denotes decryption of the quantity S in brackets using the key K. The protocols to be described below can utilize conventional public key cryptography techniques for implementing these encryption and decryption operations. In general, for the illustrative embodiments described herein, asymmetric algorithms for encryption and decryption are used for keys that include "Pub" or "Prv" in their subscript string, while symmetric algorithms are used for all other keys, e.g., the $K_{cont}$ and $K_{License}$ to be described below. These and other encryption and decryption techniques suitable for use with the present invention are well known to those skilled in the art and therefore not described in detail herein.

Figure 1:
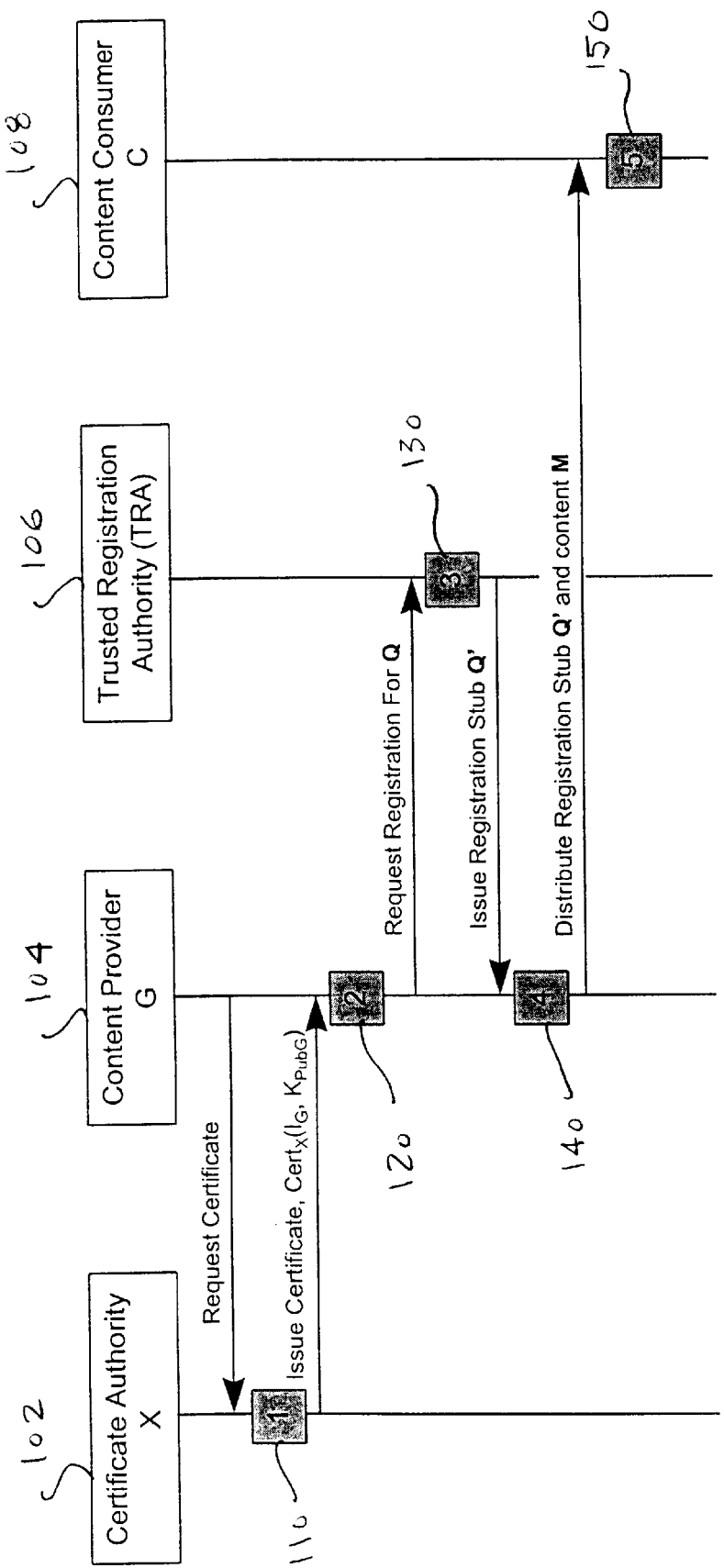
FIG. 1 illustrates content distribution method with unbound rights management in accordance with the invention.

FIG. 1 illustrates a basic protocol for distributing content with unbound rights management in accordance with a first illustrative embodiment of the invention. This figure shows the interactions between a certificate authority (CA) 102, a content provider 104, a trusted registration authority (TRA) 106 and a content consumer 108. The CA 102, content provider 104, and content consumer 108 are also denoted herein by the letters X, G and C, respectively. The method illustrated in FIG. 1 includes processing operations 110, 120, 130, 140 and 150, which are illustrated in greater detail in the flow diagrams of FIGS. 2, 3, 4, 5 and 6, respectively.

The processing operations in FIG. 1 implement a basic protocol in which distributed content is not protected by means of encryption, i.e., confidentiality of content is not provided. However, the content is protected against piracy, due to the fact that the content provider G is certified by the TRA 106, and thus can be traced or otherwise identified in the event that irregularities are detected. Moreover, in this embodiment of the invention, usage rights are not bound to the content. This allows the content provider G to change the usage rights after the content has been registered with the TRA 106.

Figure 2:
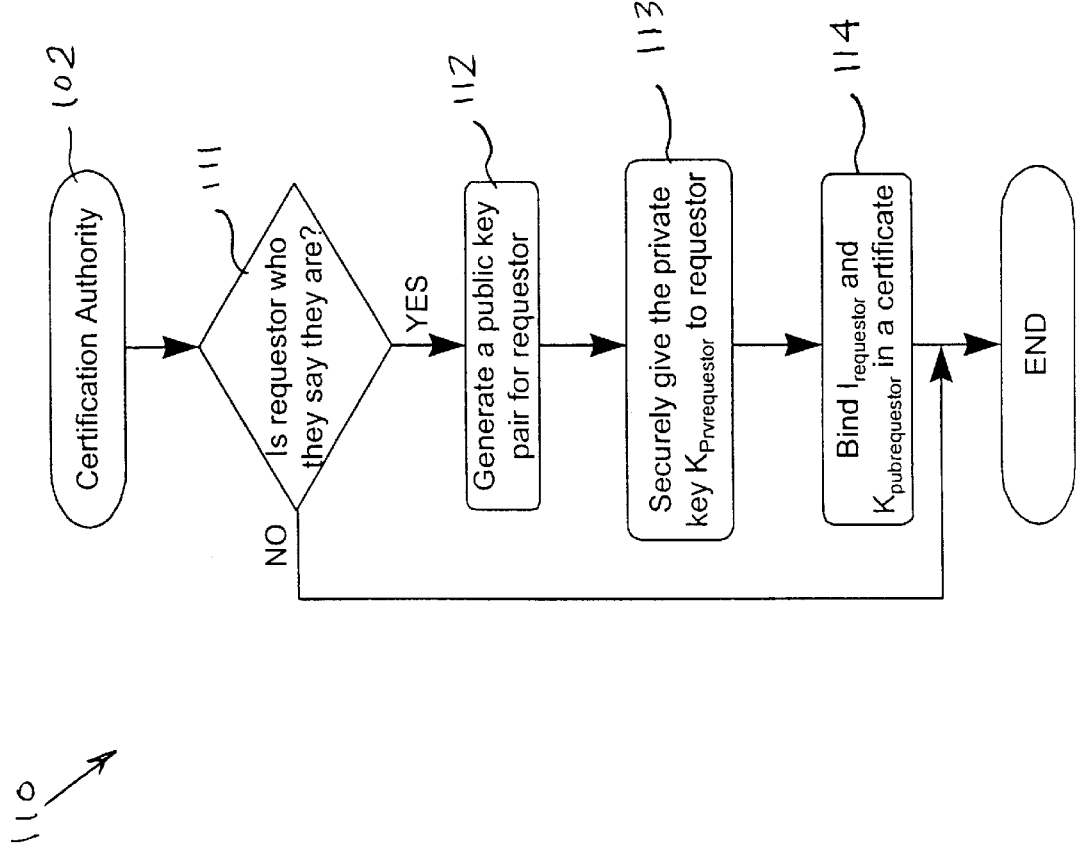
FIGS. 2, 3, 4, 5 and 6 are flow diagrams illustrating processing operations implemented in the content distribution method of FIG. 1.

In the basic protocol of FIG. 1, the content provider 104 (G) first requests a certificate from the CA 102 (X). The CA 102 generates the certificate in operation 110, which is illustrated in FIG. 2. The certificate generation process may be carried out in a conventional manner, e.g., in accordance with an established standard. In step 111, the CA 102 determines if the requester G is who they say they are. If not, the certificate is not issued. If the requestor G is determined to be who they say are, the CA 102 in step 112 generates a public key pair for the requester, and in step 113 securely gives the private key $K_{Prvrequestor}$ to the requester G. The CA 102 then binds the identity of the requestor $I_{requestor}$ and the public key $K_{Pubrequestor}$ of the requestor in a certificate, as shown in step 114, and issues the certificate $Cert_X(I_G, K_{PubG})$ to requester G as shown in FIG. 1. It should be noted that requests for certificates are not mandatory for each transaction, i.e., once someone has obtained a certificate, it may be re-used until it expires.

Figure 3:
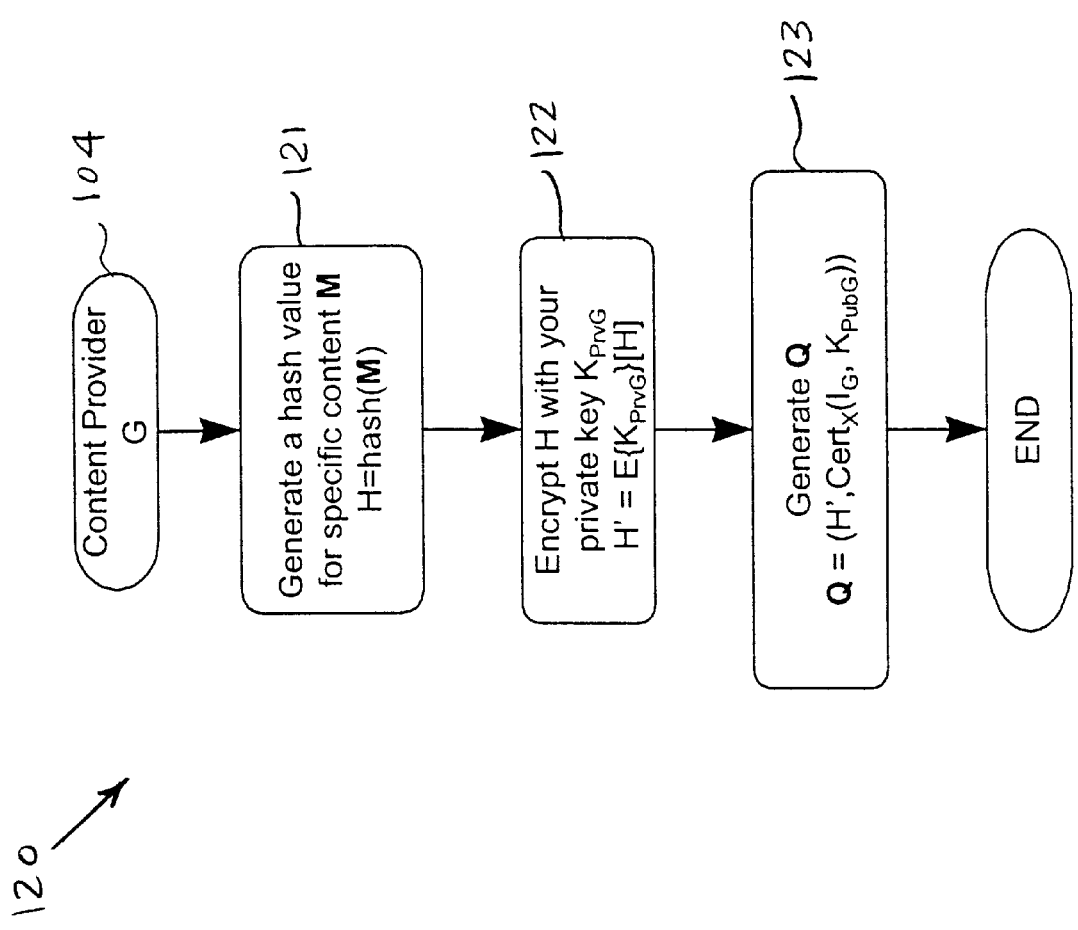

Operation 120 of FIG. 1 is illustrated in FIG. 3. The content provider G in step 121 generates a hash value for specific content M:

$$H = \text{hash}(M).$$

The content provider G in step 122 then encrypts H using its private key $K_{PrvG}$:

$$=H' = E\{K_{PrvG}\}[H],$$

and in step 123 generates Q as follows:

$$Q = (H', Cert_X(I_G, K_{PubG})).$$

The content provider G then sends a request to the TRA 106 to register Q, as shown in FIG. 1.

Figure 4:
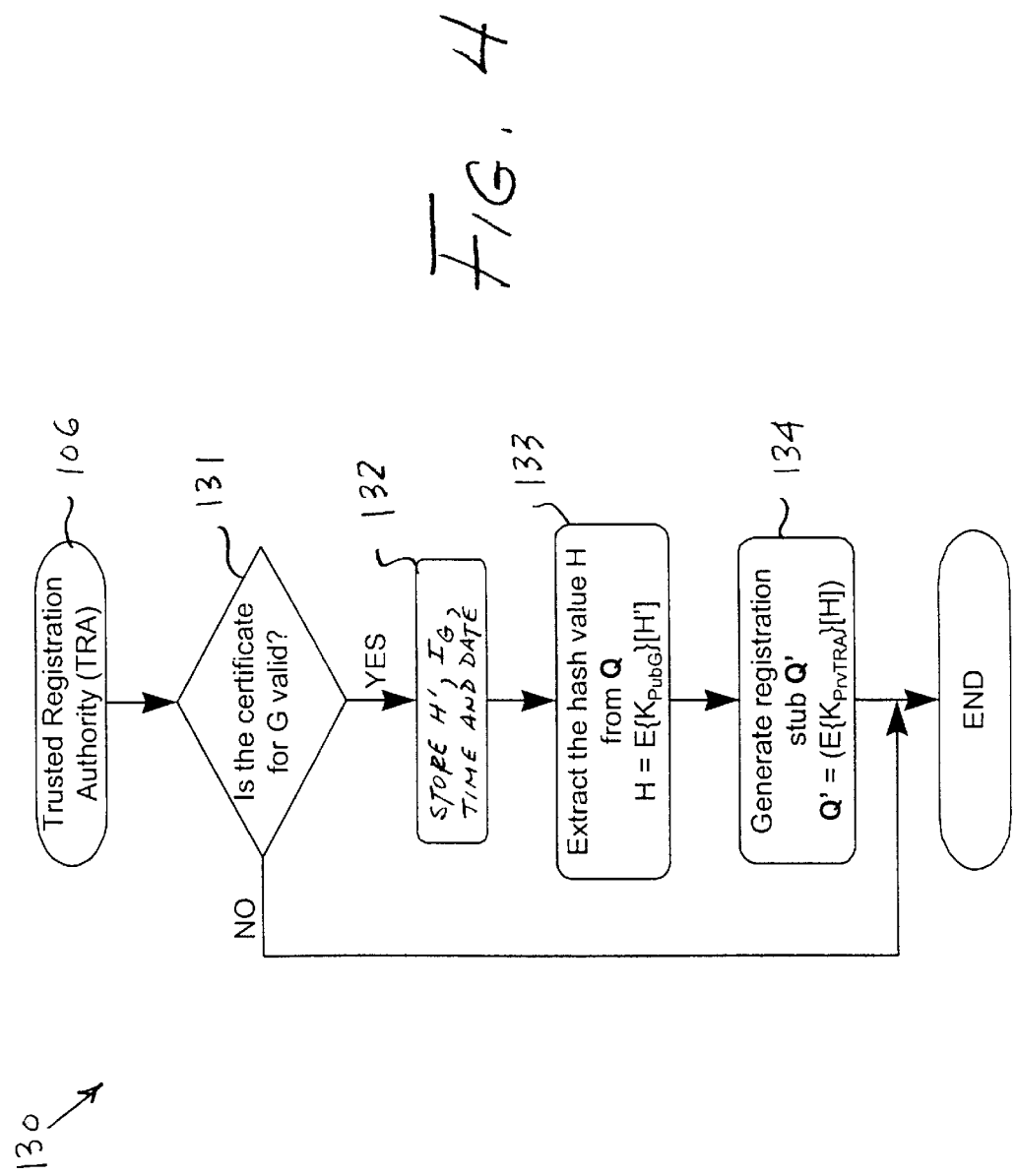

FIG. 4 shows operation 130 implemented by the TRA 106. In step 131, the TRA determines if the certificate $Cert_X(I_G, K_{PubG})$ for the content provider G is valid. If not, the operation ends, and the request for registration of Q is denied. If the certificate is determined in step 131 to be valid, the TRA in step 132 stores the H' and $I_G$ pair as well as the time and date of receipt. In step 133, the TRA extracts the hash value H from Q as follows:

$$H = D\{K_{PubG}\}[H']$$

The TRA then in step 134 generates a registration stub Q' as follows:

$$Q' = E\{K_{PrvTRA}\}[H].$$

The TRA thus decrypts the hash value H sent by the content provider G and re-encrypts it with its private key $K_{PrvTRA}$. The resulting registration stub Q' is issued to the content originator G, as shown in FIG. 1.

Figure 5:
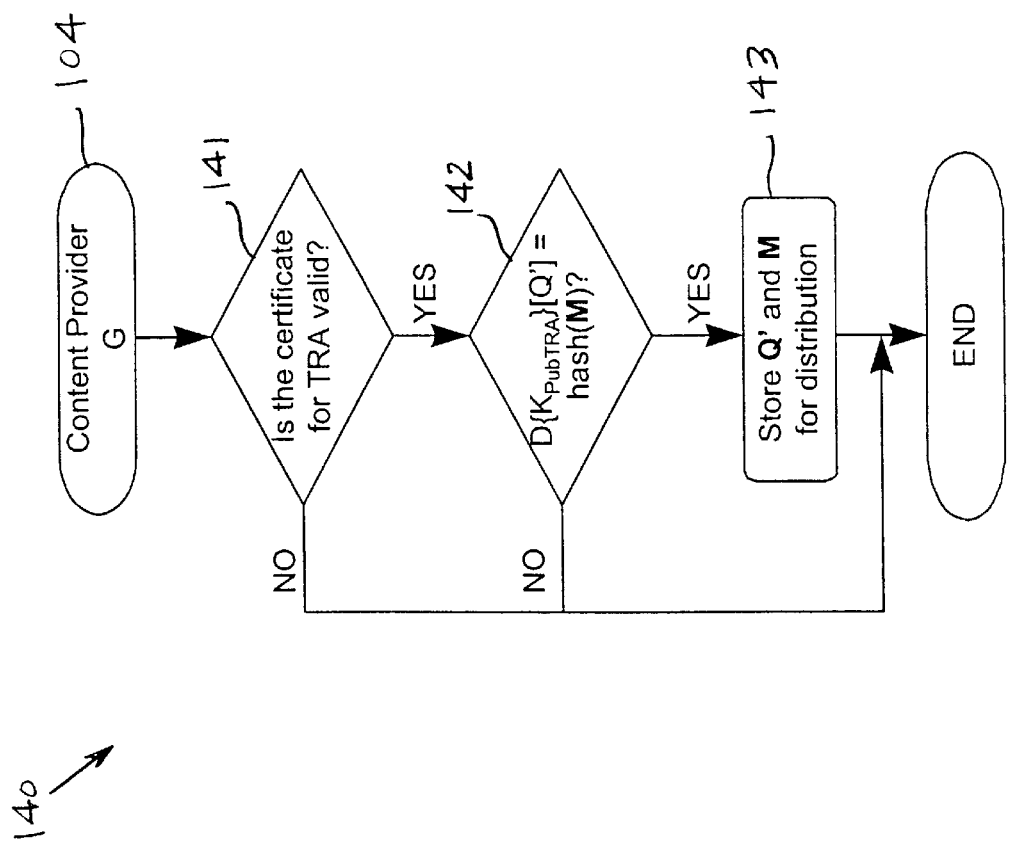

Operation 140 of FIG. 1 is then performed by the content provider G. FIG. 5 shows this operation in greater detail. It is assumed that the content provider G has obtained the certificate for the TRA, in any conventional manner. In step 141, the content provider G determines if the certificate for the TRA is valid. If not, the operation ends. If the certificate for the TRA is valid, the content provider G then determines in step 142 if:

$$D\{K_{PubTRA}\}[Q'] = \text{hash}(M).$$

If it is, then Q' and M are stored in step 143 for subsequent distribution. Otherwise, the operation ends without storing Q' and M. If Q' and M are stored, the content provider knows that the registration process for the content M has been successfully completed, and the content provider is therefore free to distribute the content to one or more consumers.

Figure 6:
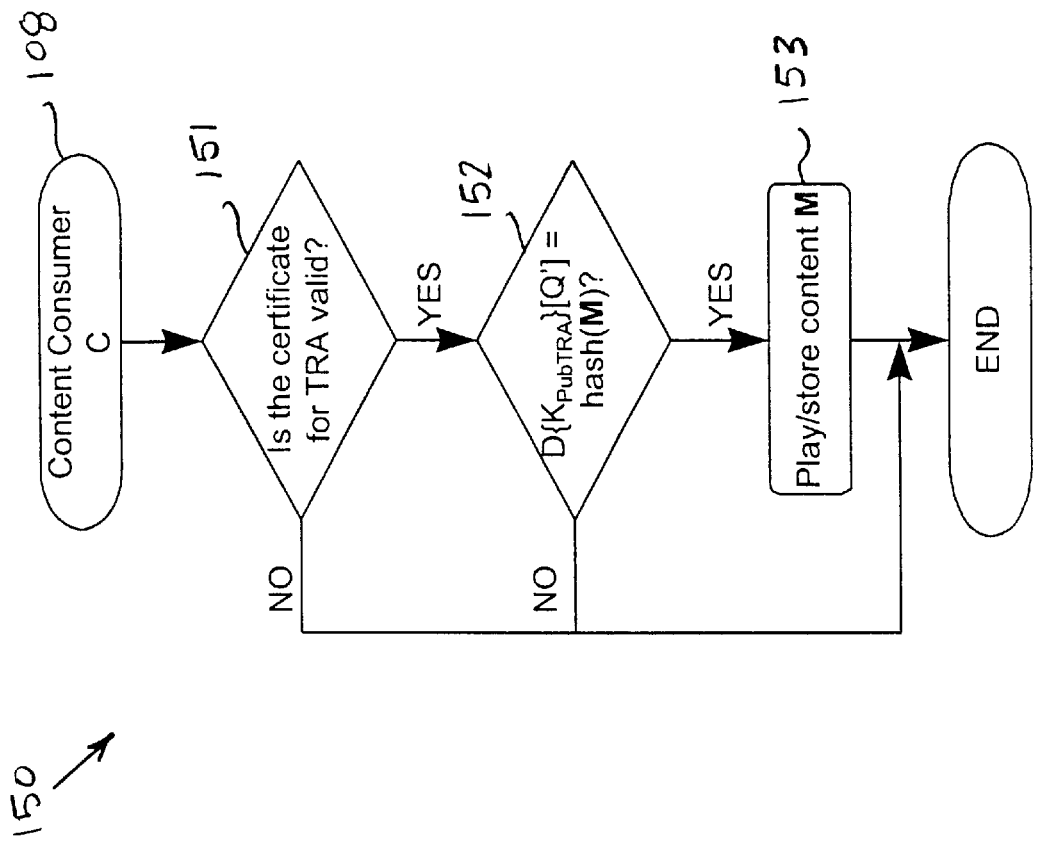

Referring again to FIG. 1, after successful completion of operation 140, the content provider distributes the registration stub Q' and the content M to the content consumer 108 (C). FIG. 6 shows the operation 150 as performed by the content consumer C. The content consumer C in step 151 determines if the certificate for TRA is valid. If not, the operation ends. Otherwise, the content consumer determines in step 152 if $$D\{K_{PubTRA}\}[Q'] = \text{hash}(M).$$

If not, the operation ends. Otherwise, the content consumer C in step 153 plays and/or stores the content M. The content consumer C thus accepts the content only if the content provider G is validated as "bona fide."

It should be noted that operation 150 and other operations described herein as performed by a content consumer may be performed in a tamper-proof or tamper-resistant device, e.g., when content is decrypted by a content consumer, the decrypted content should not be accessible to unauthorized users and devices.

As previously noted, the content M may be music or any other type of content. It may be in a compressed format, generated using any suitable coding device, or in an uncompressed format. Guaranteed distribution to a single content consumer can be implemented using a conventional secure link protocol, as will be apparent to those skilled in the art.

A potential protection problem can arise in the above-described basic protocol if the content consumer can play legacy content as well as content which is accompanied by the registration stub Q'. Namely, if Q' is lost or otherwise not present, there is no way to distinguish legacy content from registered content in the basic protocol.

In the enhanced versions of the protocol to be described below, the encrypted format provides the distinction, so this protection problem is generally not an issue. However, the protection problem can also be solved in the basic protocol by providing an embedded watermark in the content M. This embedded watermark indicates to the content consumer that a valid registration stub Q' should be present before the content could be played. In such an embodiment, the operation 150 illustrated in FIG. 6 is modified to include before step 151 an additional processing step which determines if M contains a watermark indicating that Q' should be present. If it does, the operation continues with step 151. If there is no such watermark, the operation skips steps 151 and 152, and proceeds with step 153. Other configurations are also possible, e.g., the above-described additional processing step for the embedded watermark may be performed between processing steps 151 and 152 of FIG. 6.

It should be noted that the embedded watermark need only indicate that a valid registration stub should be present, and possibly the kind of stub, e.g., hash(M), etc. The embedded watermark therefore need not contain the registration stub itself. In addition, it should be noted that such a watermark can also be used in content which is distributed using the enhanced versions of the protocol to be described below, so as to prevent recording and distribution of content to devices that support only the basic protocol.

Figure 7:
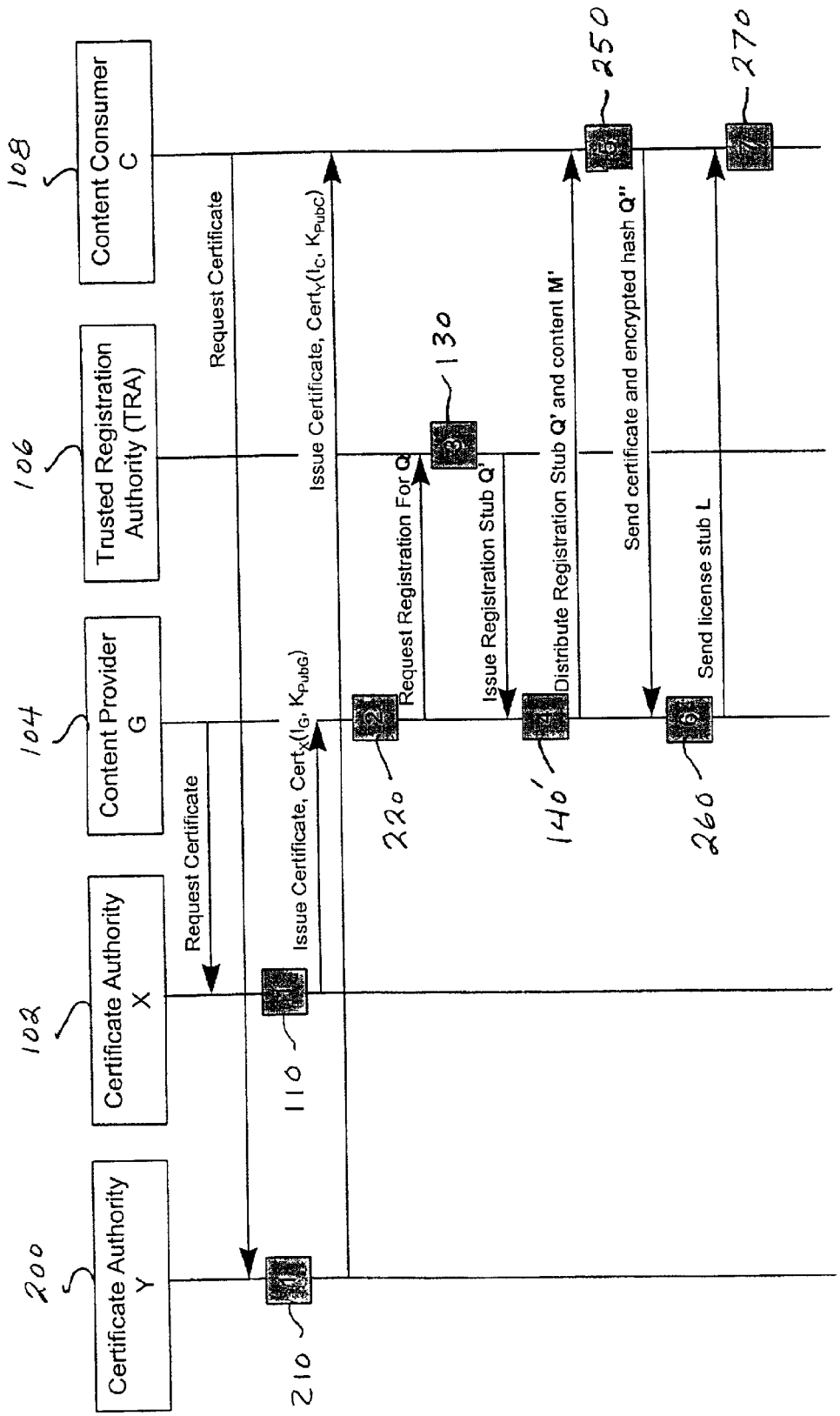
FIG. 7 illustrates a content distribution method with unbound rights management an content confidentiality in accordance with the invention.

FIG. 7 illustrates a content distribution method with unbound rights management and content confidentiality in accordance with a second illustrative embodiment of the invention. This figure shows the interactions between an additional certificate authority, CA 200, also referred to as CA Y, and the entities CA (X) 102, content provider 104, TRA 106 and content consumer 108. FIGS. 8, 9, 10 and 11 are flow diagrams illustrating processing operations implemented in the content distribution method of FIG. 7. The method illustrated in FIG. 7 includes processing operations 210, 220, 250, 260 and 270. Processing operation 210 corresponds generally to operation 110 of FIG. 2, but is implemented by the CA (Y) 200. Processing operations 220, 250, 260 and 270 are illustrated in greater detail in the flow diagrams of FIGS. 8, 9, 10 and 11, respectively.

The processing operations in FIG. 7 implement an enhanced version of the basic protocol of FIG. 1. In this enhanced protocol, the content is protected by means of encryption, i.e., content confidentiality is provided. In addition, as in the previously-described basic protocol, the content in the enhanced protocol is also protected from piracy, and the usage rights are not bound to the content, allowing the publisher to change the usage rights after the content has been registered.

In the enhanced protocol of FIG. 7, the content provider (G) 104 requests a certificate from the CA (X) 102, and the content consumer (C) 108 requests a certificate from the CA (Y) 200. The CAs 102, 200 generate certificates $Cert_X(I_G, K_{PubG})$, $Cert_Y(I_C, K_{PubC})$, respectively, in operations 110 and 210, respectively, in the manner previously described in conjunction with FIG. 2. The certificate $Cert_X(I_G, K_{PubG})$ is issued by CA 102 to the content provider G, and the certificate $Cert_Y(I_C, K_{PubC})$ is issued by the CA 200 to the content consumer C. It should be noted that the CA 102 and CA 200 can be the same CA. In this example, they are shown as separate entities in order to illustrate that the certificates do not have to come from the same CA.

Figure 8:
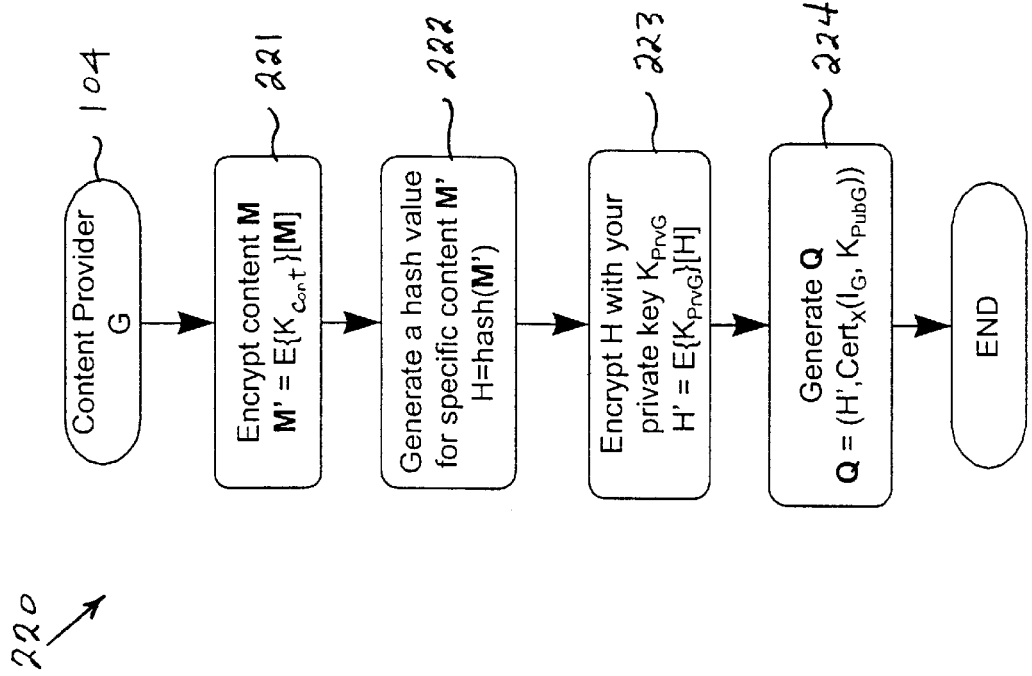
FIGS. 8, 9, 10 and 11 are flow diagrams illustrating processing operations implemented in the content distribution method of FIG. 7.

Operation 220 of FIG. 7 is illustrated in FIG. 8. The content provider G in step 221 encrypts the content M to generate encrypted content M':

$$M'=E\{K_{Cont}\}[M].$$

It should be noted that $K_{Cont}$ need not be a single key. For example, it could be a sequence of keys, with each of the keys in the sequence used to encrypt different parts of the content. The content provider G in step 222 generates a hash value for specific content M':

$$H=\text{hash}(M').$$

The content provider G in step 223 then encrypts H using its private key $K_{PrvG}$:

$$H'=E\{K_{PrvG}\}[H],$$

and in step 224 generates Q as follows:

$$Q=(H', Cert_X(I_G, K_{PubG})).$$

The content provider G then sends a request to the TRA 106 to register Q, as shown in FIG. 7. The request is processed by the TRA 106 in operation 130 as illustrated in FIG. 4, and the registration stub Q' is issued by TRA 106 to the content provider G.

The content provider G then performs operation 140', which is the same as operation 140 of FIG. 5 except that M is replaced by M' in steps 142 and 143. Q' and M' being stored is a result of the condition check 142. If 142 is true then Q' and M' are stored and the content provider G knows that the registration process for the encrypted content M' has been successfully completed. The content provider is therefore free to distribute the encrypted content to one or more consumers.

Referring again to FIG. 7, after successful completion of operation 140', the content provider G distributes the registration stub Q' and the encrypted content M' to the content consumer 108 (C).

Figure 9:
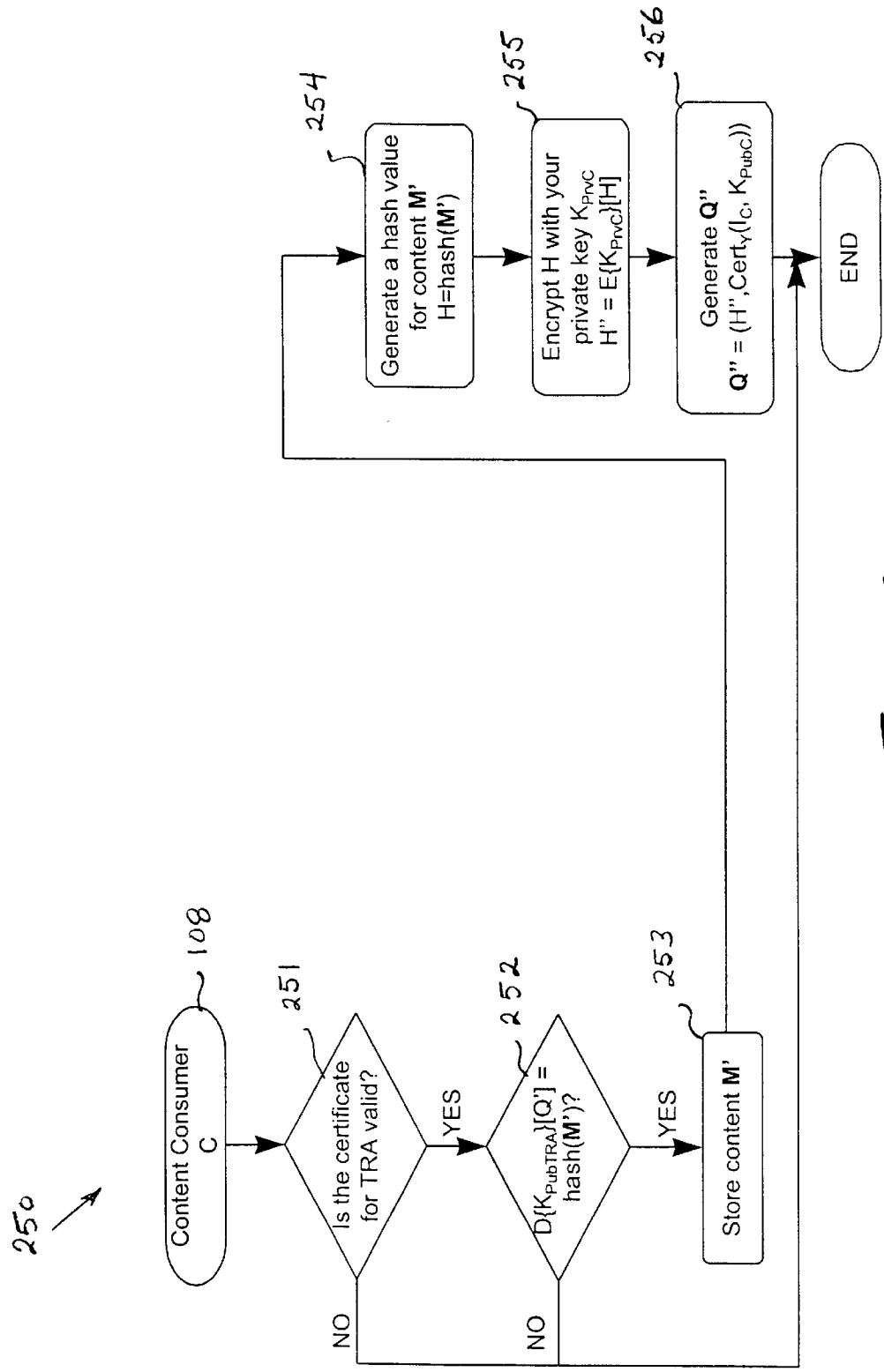

FIG. 9 shows the operation 250 as performed by the content consumer C. The content consumer C in step 251 determines if the certificate for TRA is valid. If not, the operation ends. Otherwise, the content consumer determines in step 252 if $$D\{K_{PubTRA}\}[Q]=\text{hash}(M').$$

If not, the operation ends. Otherwise, the content consumer C in step 253 stores the encrypted content M'. The content consumer C thus stores the encrypted content only if the content provider G is validated as "bona fide."

In order to access the content, the content consumer C must also receive the content decryption key $K_{Cont}$ as well as any usage rules defined by the originator. This information is sent to the content consumer C only after successful verification of consumer identity by the content provider G. To this end, the content consumer C in step 254 of operation 250 generates a hash value for the encrypted content M':

$$H=\text{hash}(M').$$

The content consumer in step 255 then encrypts H using the private key $K_{PrvC}$:

$$H''=E\{K_{PrvC}\}[H],$$

and in step 256 generates a pair Q" including the encrypted hash value and the above-noted certificate $Cert_Y(I_C, K_{PubC})$ $$Q''=(H'', Cert_Y(I_C, K_{PubC})).$$

The pair Q" is then sent from the content consumer C to the content provider G.

Figure 10:
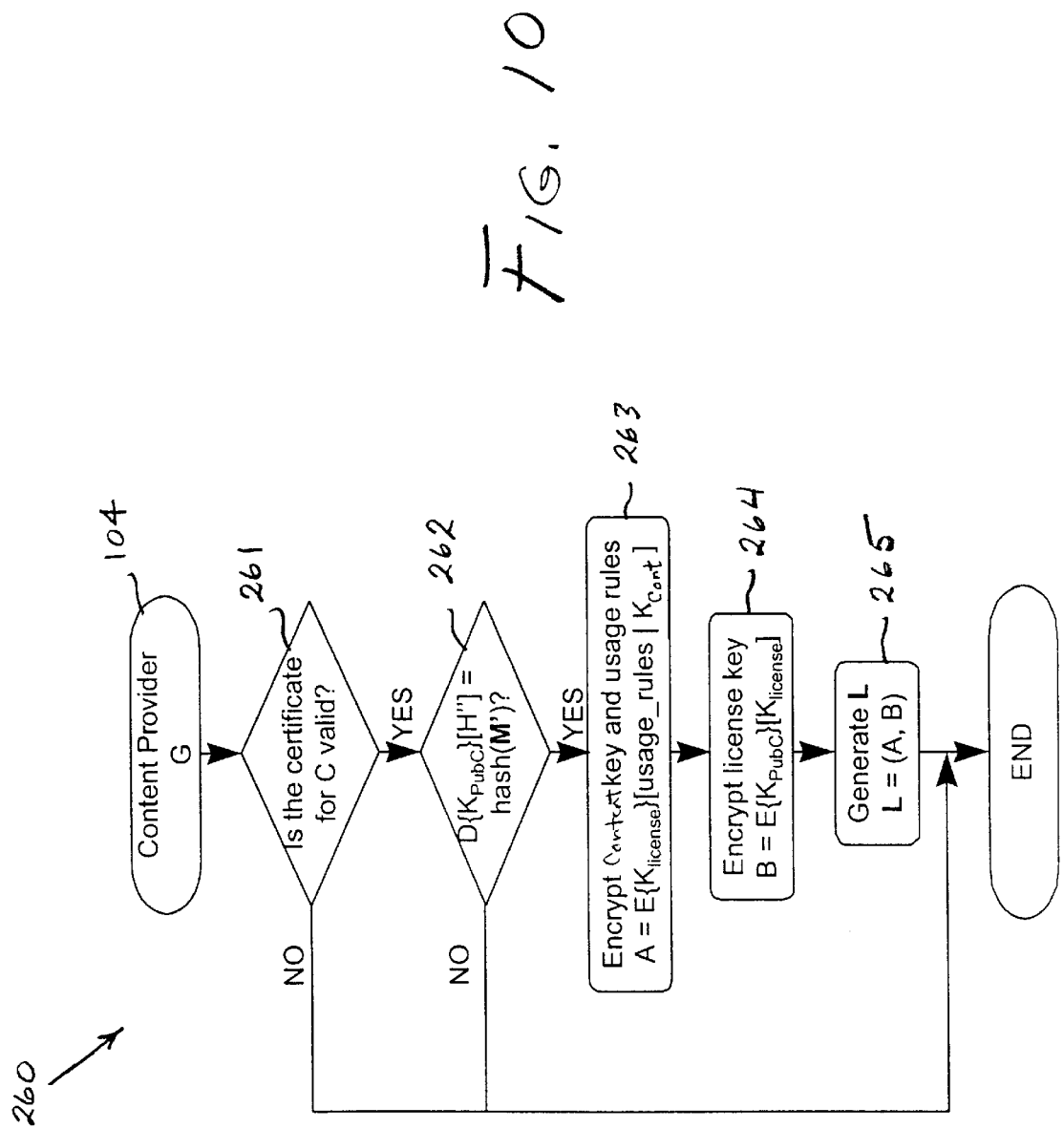

FIG. 10 shows operation 260 performed by the content provider G. In step 261, the content provider G determines if the certificate $Cert_Y(I_C, K_{PubC})$ of content consumer C is valid. If not, the operation ends. Otherwise, the content provider G in step 262 determines if $$D\{K_{PubC}\}[H''] = \text{hash}(M').$$

If not, the operation ends. Otherwise, the content provider G in step 263 uses a license key $K_{license}$ to encrypt the content key $K_{Cont}$ and usage rules:

$$A = E\{K_{license}\}[\text{usage\_rules}|K_{Cont}],$$

and then in step 264 encrypts the license key:

$$B = E\{K_{PubC}\}[K_{license}].$$

A license stub L is then generated in step 265 as the pair (A, B). As shown in FIG. 7, the content provider G then sends the license stub L to the content consumer C.

Figure 11:
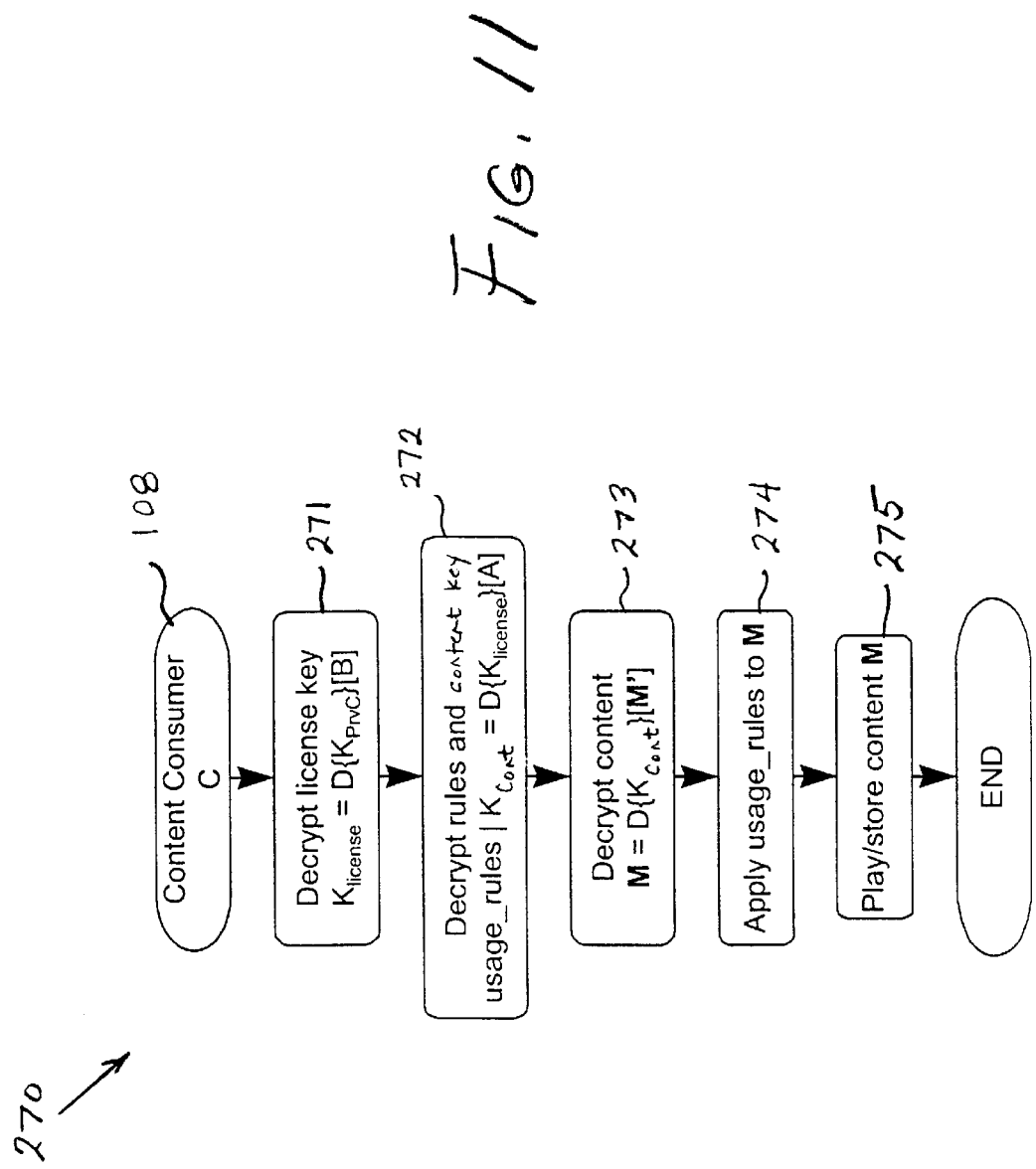

FIG. 11 shows the operation 270 performed by the content consumer C upon receipt of the license stub L. In step 271, the content consumer C decrypts the license key:

$$K_{license} = D\{K_{PrvC}\}[B],$$

and then in step 272 decrypts the rules and content key:

$$\text{usage\_rules}|K_{Cont} = D\{K_{license}\}[A].$$

The content consumer C in step 273 then decrypts the encrypted content M':

$$M = D\{K_{Cont}\}[M'].$$

The content consumer in step 274 then applies the usage rules to the content M, and in step 275 plays and/or stores the content M.

Figure 12:
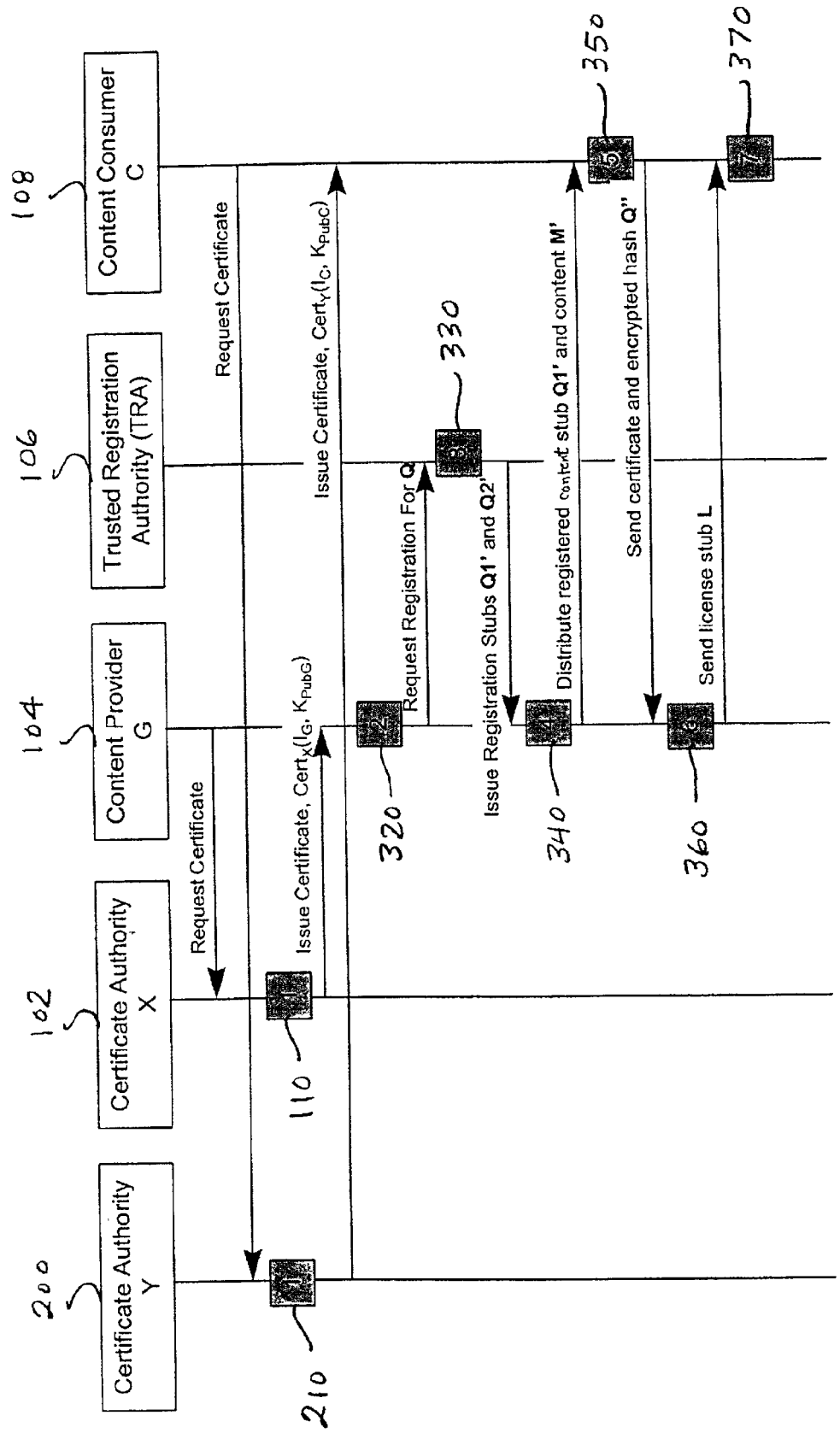
FIG. 12 illustrates a content distribution method with bound rights management and content confidentiality in accordance with the invention.

FIG. 12 illustrates a content distribution method with bound rights management and content confidentiality in accordance with a third illustrative embodiment of the invention. This figure shows interactions between the entities CA(Y) 200, CA(X) 102, content provider (G) 104, TRA 106 and content consumer (C) 108. FIGS. 13, 14, 15, 16, 17 and 18 are flow diagrams illustrating processing operations 320, 330, 340, 350, 360 and 370, respectively, implemented in the content distribution method of FIG. 12. Processing operations 110 and 210 are implemented in the manner described previously in conjunction with the embodiment of FIG. 7.

The processing operations in FIG. 12 implement an alternative enhanced version of the basic protocol of FIG. 1. In this alternative enhanced protocol, as in the enhanced protocol of FIG. 7, the content is protected by means of encryption, i.e., content confidentiality is provided. In addition, as in the previously-described basic and enhanced protocols, the content in the alternative enhanced protocol is protected from piracy. However, unlike the previously-described protocols, this alternative enhanced protocol also guarantees that the license is authentic, because it is bound together with the content and registered with the TRA 106.

It should be noted that this approach limits the content provider G in that the content provider G cannot change the content usage rules after the content has been registered with the TRA 106. Consequently, if the content provider G wants to change the usage rules after registration, a new registration would be required.

In the enhanced protocol of FIG. 12, the content provider (G) 104 requests a certificate from the CA (X) 102, and the content consumer (C) 108 requests a certificate from the CA (Y) 200. The CAs 102, 200 generate certificates $Cert_X(I_G, K_{PubG})$, $Cert_Y(I_C, K_{PubC})$, respectively, in operations 110 and 210, respectively, in the manner previously described in conjunction with FIG. 2. The certificate $Cert_X(I_G, K_{PubG})$ is issued by CA 102 to the content provider G, and the certificate $Cert_Y(I_C, K_{PubC})$ is issued by the CA 200 to the content consumer C. As noted previously, the CA 102 and CA 200 can be the same CA.

Figure 13:
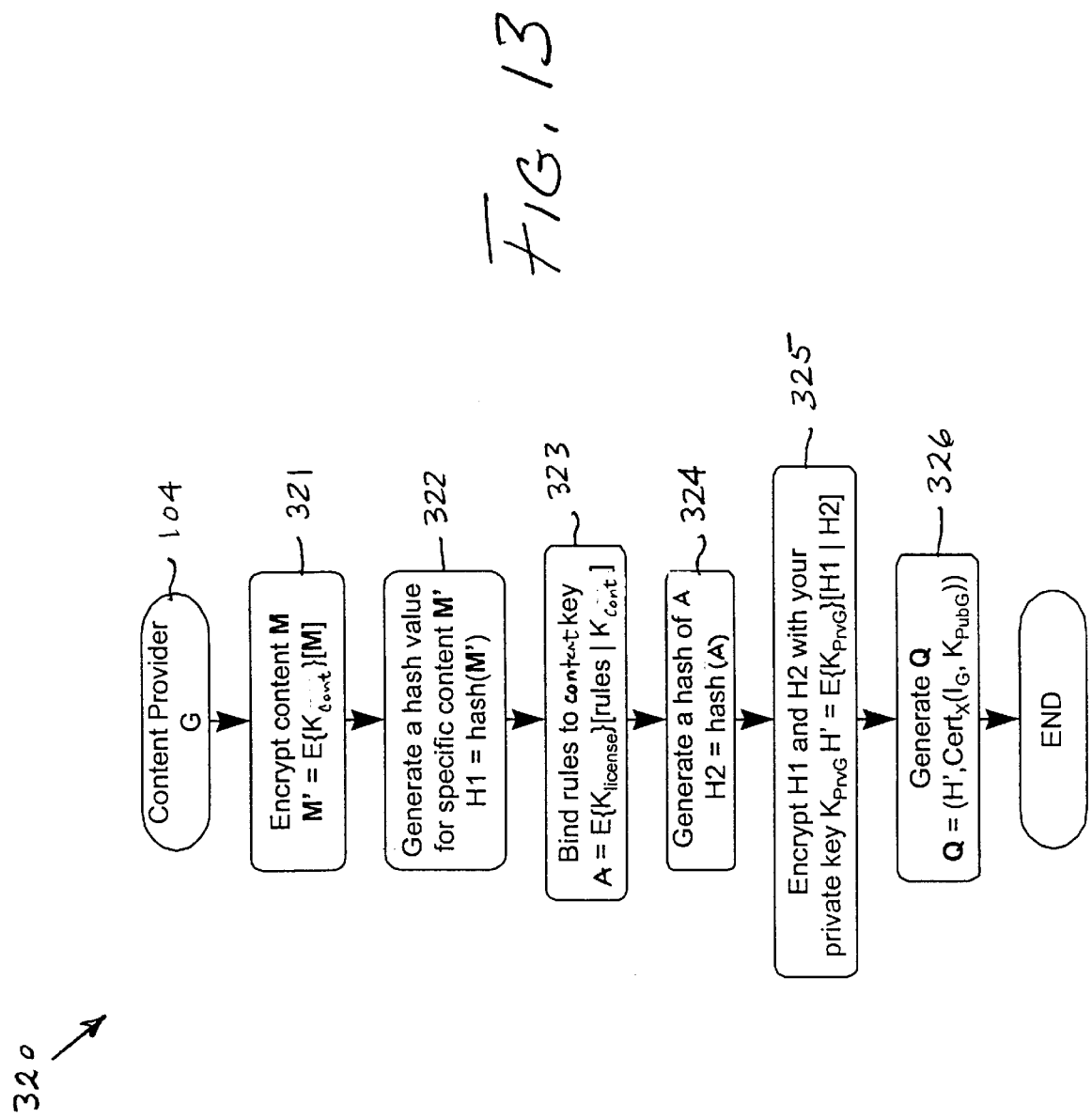
FIGS. 13, 14 , 15, 16, 17 and 18 are flow diagrams illustrating processing operations implemented in the content distribution method of FIG. 12.

Operation 320 of FIG. 12 is illustrated in FIG. 13. The content provider G in step 321 encrypts the content M to generate encrypted content M':

$$M' = E\{K_{Cont}\}[M].$$

As previously noted, $K_{Cont}$ need not be a single key, and could be, e.g., a sequence of keys, with each of the keys in the sequence used to encrypt different parts of the content.

The content provider G in step 322 generates a hash value for specific content M':

$$H1 = \text{hash}(M').$$

In step 323, the content provider G binds a set of rules to the content key by generating a license registration stub A as follows:

$$A = E\{K_{license}\}[\text{usage\_rules}|K_{Cont}].$$

It should be noted that the binding of the rules to a specific content key may be done through encryption, as shown above, or alternatively through any other cryptographic binding mechanism. When done through encryption, the encryption should utilize a chaining mode in order to prevent a block replay attack that could break the binding.

After the binding of the rules in step 323, a hash value of A is then generated in step 324:

$$H2 = \text{hash}(A).$$

The content provider G in step 325 then encrypts H1 and H2 using its private key $K_{PrvG}$:

$$H' = E\{K_{PrvG}\}[H1|H2],$$

and in step 326 generates Q as follows:

$$Q = (H', Cert_X(I_G, K_{PubG})).$$

Figure 14:
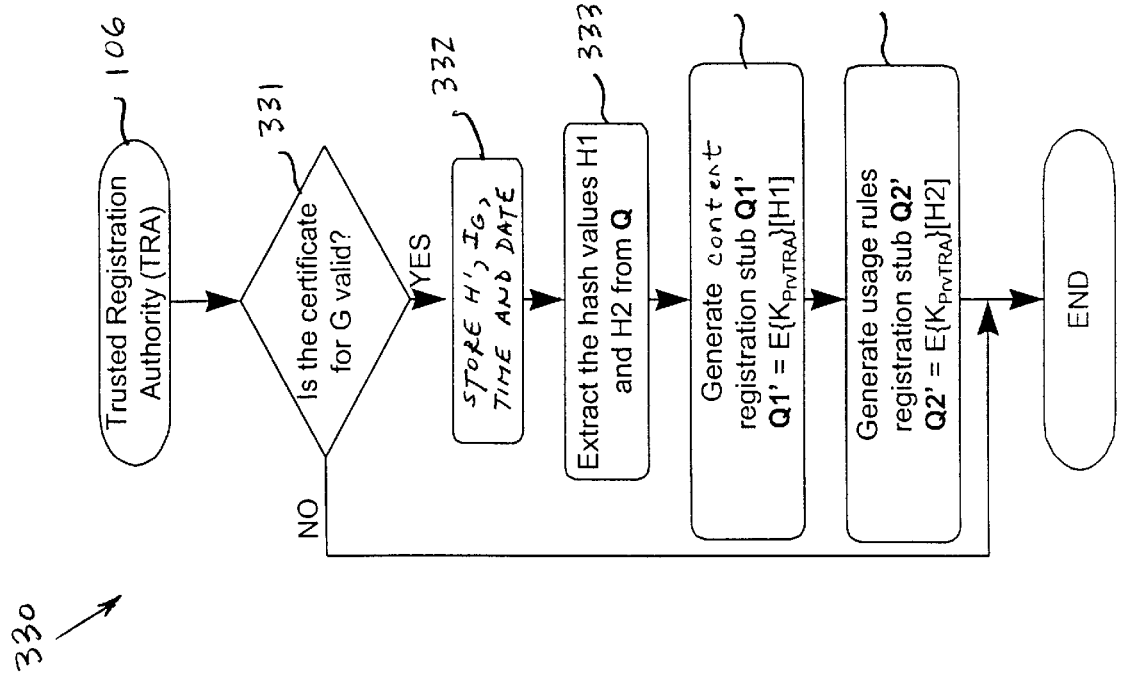

The content provider G then sends a request to the TRA 106 to register Q, as shown in FIG. 12. The request is processed by the TRA 106 in operation 330 as illustrated in FIG. 14. In step 331, the TRA determines if the certificate $Cert_X(I_G, K_{PubG})$ for the content provider G is valid. If not, the operation ends, and the request for registration of Q is denied. If the certificate is determined in step 331 to be valid, the TRA in step 332 stores the H' and $I_G$ pair as well as the time and date of receipt. In step 333, the TRA extracts the hash values H1 and H2 from Q. The TRA then in step 334 generates a content registration stub Q1' as follows:

$$Q1' = E\{K_{PrvTRA}\}[H1],$$

and in step 334 generates a usage rules registration stub Q2' as follows:

$$Q2' = E\{K_{PrvTRA}\}[H2].$$

The TRA thus decrypts the hash values H1 and H2 sent by the content provider G and re-encrypts them using its private key $K_{prvTRA}$. The resulting registration stubs Q1' and Q2' are issued to the content originator G, as shown in FIG. 12.

Figure 15:
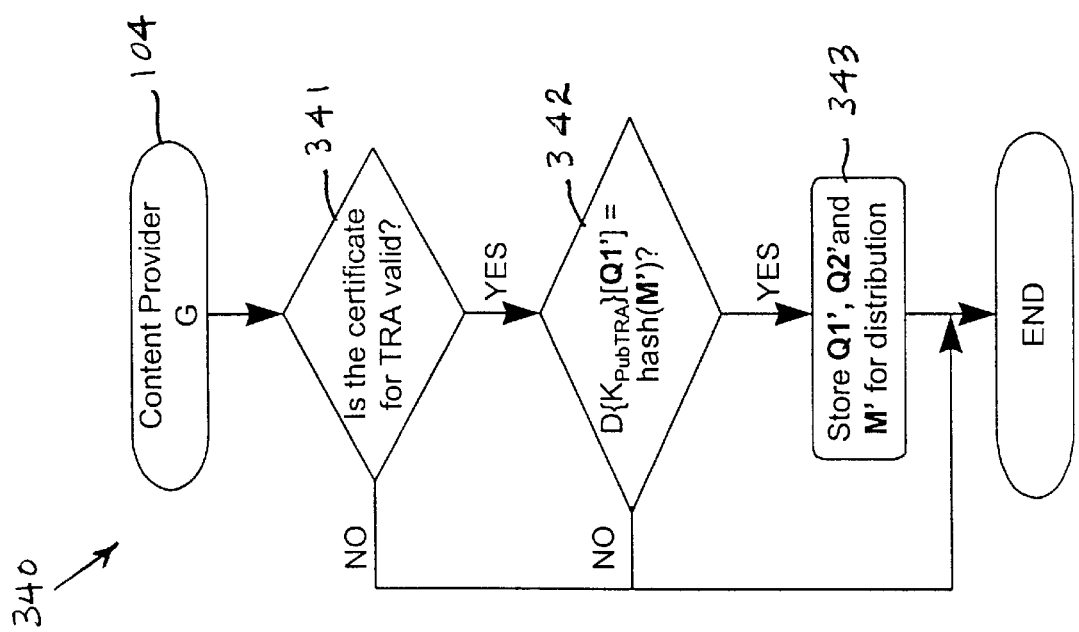

Operation 340 of FIG. 12 is then performed by the content provider G. FIG. 15 shows this operation in greater detail. In step 341, the content provider G determines if the certificate for the TRA is valid. If not, the operation ends. If the certificate for the TRA is valid, the content provider G then determines in step 142 if:

$$D\{K_{PubTRA}\}[Q1']=\text{hash}(M').$$

If it is, then Q1', Q2' and M' are stored in step 343 for subsequent distribution. Otherwise, the operation ends without storing Q1', Q2' and M'. If Q1', Q2' and M' are stored, the content provider knows that the registration process for the encrypted content M' has been successfully completed, and the content provider is therefore free to distribute the content to one or more consumers.

Referring again to FIG. 12, after successful completion of operation 340, the content provider G distributes the registered content stub Q1' and the encrypted content M' to the content consumer 108 (C).

Figure 16:
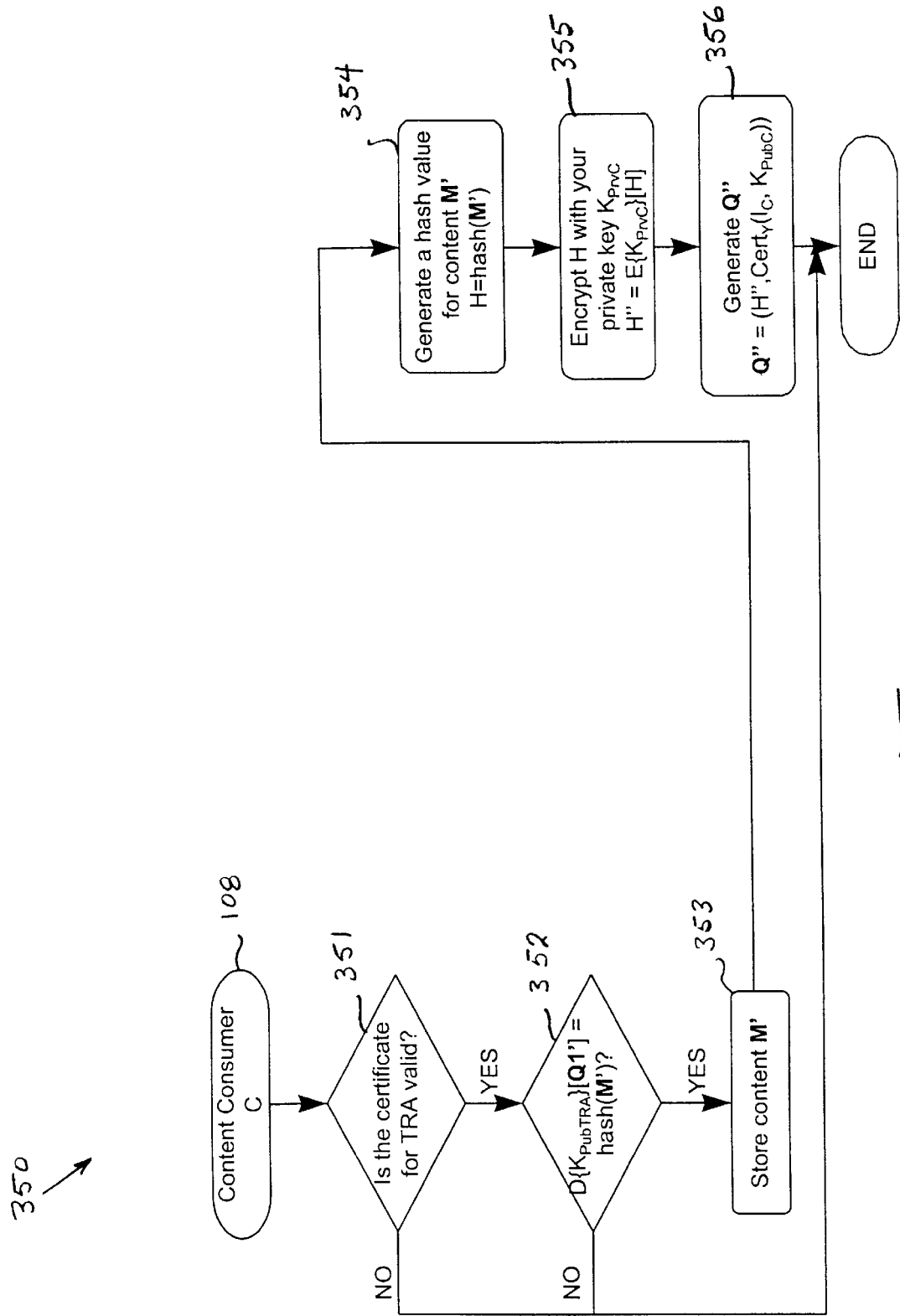

FIG. 16 shows the operation 350 as performed by the content consumer C. The content consumer C in step 351 determines if the certificate for TRA is valid. If not, the operation ends. Otherwise, the content consumer C determines in step 352 if $$D\{K_{PubTRA}\}[Q1']=\text{hash}(M').$$

If not, the operation ends. Otherwise, the content consumer C in step 353 stores the encrypted content M'. The content consumer C thus stores the encrypted content only if the content provider G is validated as "bona fide."

In order to access the content, the content consumer C must also receive the content encryption key $K_{Cont}$ as well as any usage rules defined by the originator. This information is sent to the content consumer C only after successful verification of consumer identity by the content provider G. To this end, the content consumer C in step 354 of operation 350 generates a hash value for the encrypted content M':

$$H=\text{hash}(M').$$

The content consumer in step 355 then encrypts H using the private key $K_{PrvC}$:

$$H''=E\{K_{PrvC}\}[H].$$

and in step 356 generates a pair Q" including the encrypted hash value and the above-noted certificate $\text{Cert}_Y(I_C, K_{PubC})$:

$$Q''=(H'', \text{Cert}_Y(I_C, K_{PubC})).$$

The pair Q" is then sent from the content consumer C to the content provider G.

Figure 17:
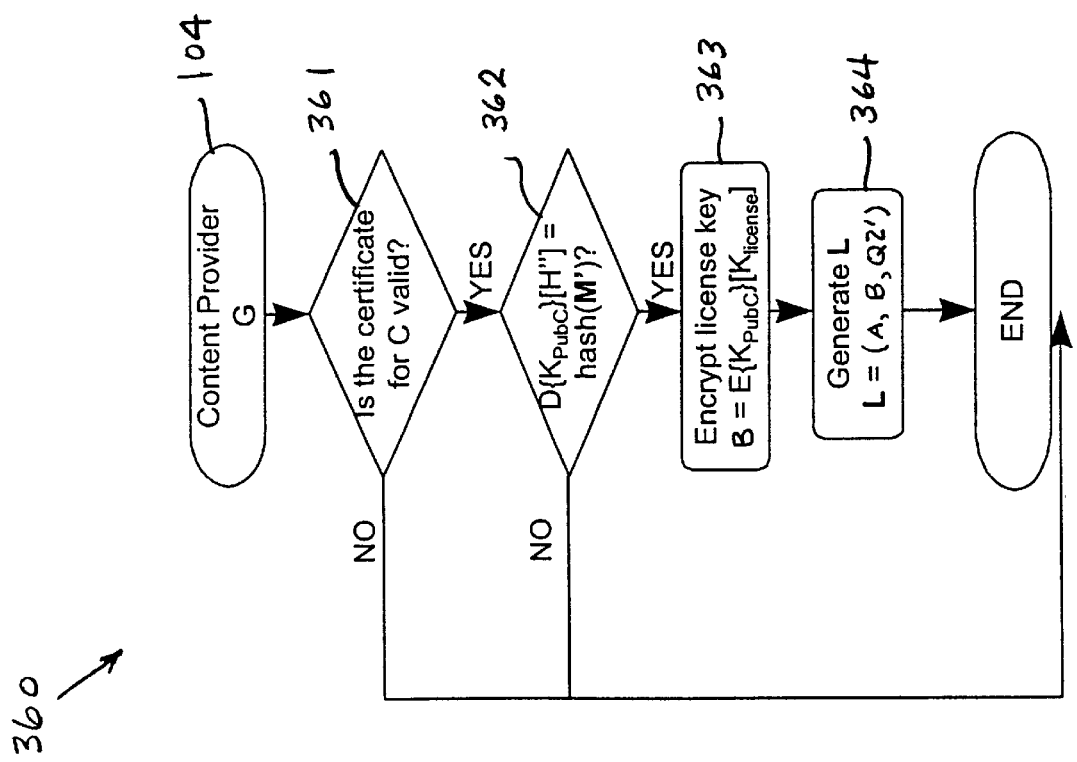

FIG. 17 shows operation 360 performed by the content provider G. In step 361, the content provider G determines if the certificate $\text{Cert}_Y(I_C, K_{PubC})$ of content consumer C is valid. If not, the operation ends. Otherwise, the content provider G in step 362 determines if $$D\{K_{PubC}\}[H'']=\text{hash}(M').$$

If not, the operation ends. Otherwise, the content provider G in step 363 encrypts the license key $K_{license}$ using the public key $K_{PubC}$ of the content consumer C:

$$B=E\{K_{PubC}\}[K_{license}].$$

A license stub L is then generated in step 364 as the triple (A, B, Q2'). As shown in FIG. 12, the content provider G then sends the license stub L to the content consumer C.

Figure 18:
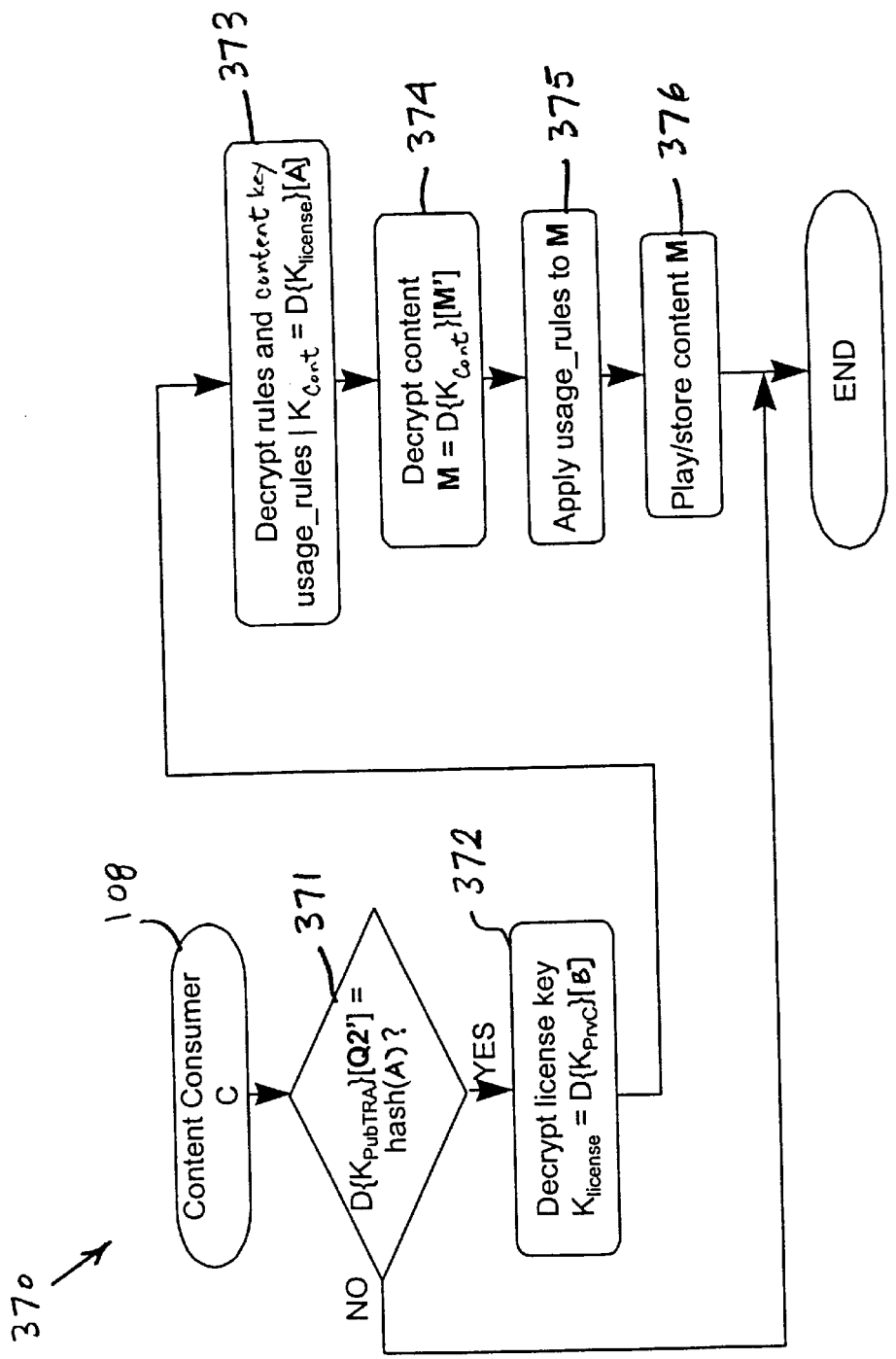

FIG. 18 shows the operation 370 performed by the content consumer C upon receipt of the license stub L. In step 371, the content consumer C determines if:

$$D\{K_{PubTRA}\}[Q2']=\text{hash}(A).$$

If not, the process ends. Otherwise, the content consumer C in step 372 decrypts the license key:

$$K_{license}=D\{K_{PrvC}\}[B].$$

and then in step 373 decrypts the rules and content key:

$$\text{usage\_rules}|K_{Cont}=D\{K_{license}\}[A].$$

The content consumer C in step 374 then decrypts the encrypted content M':

$$M=D\{K_{Cont}\}[M'].$$

The content consumer in step 375 then applies the usage rules to the content M, and in step 376 plays and/or stores the content M.

In the above-described protocols, if an illegal copy of a particular piece of content, e.g., a pirated music selection, is registered in an attempt to make the illegal copy SDMI compliant, the TRA 106 will perform the registration without any problems. Such a registration, however, requires that the content provider G correctly identify itself by presenting a certificate to the TRA 106. Thus, even though an illegal copy was registered, the content provider who made the registration can be immediately identified and prosecuted. In this manner, violators are pursued after the content is released to the content consumer and only when a conflict arises. The grounds for identification of a registered content provider should be legally defined to require an accuser to present a valid and prior registration for the same or sufficiently similar content.

It should be noted that one or more of the CAs 102 and 200, content provider 104, TRA 106, and content consumer 108 may each represent one or more personal computers, workstations, mainframe computers, or other processor-based devices for implementing the processing operations associated with the described protocols. Such processor devices will generally include one or more memory devices for storing suitable software program instructions associated with the described processing functions, and at least one processor for executing the software program instructions. The communications between these entities as shown in FIGS. 1, 7 and 12 may be network connections implemented over a global communication network such as the Internet, a wide area network, a local area network, an intranet, an extranet, as well as combinations of these and other networks. FIGS. 1, 7 and 12 may thus also be viewed as system diagrams illustrating the interconnection between system processing elements for implementing the corresponding protocols.

The above-described embodiments of the invention are intended to be illustrative only. For example, the invention can be used to implement upgrading or other reconfiguration of any desired type of software or hardware component, as well as combinations of these and other components, for any desired type of processor-based device, and in many applications other than those described herein. The invention can also be implemented at least in part in the form of one or more software programs which are stored on an otherwise conventional electronic, magnetic or optical storage medium and executed by a processing device, e.g., by the processors 220 and 230 of system 200. These and numerous other embodiments within the scope of the following claims will be apparent to those skilled in the art.

What is claimed is:

1. A method of distributing content from a content provider to a content consumer, the method comprising the steps of:

requesting registration of the content by the content provider with a trusted registration authority, the registration of the content with the trusted registration authority being based, at least in part, on a certificate obtained by the content provider from a certification authority;

receiving registration information by the content provider from the trusted registration authority; and distributing, by the content provider, at least a portion of the registration information to the content consumer in conjunction with the content, wherein the content provider generates a hash value H for specific content M, encrypts H using its private key $K_{PrvG}$ to generate an encrypted hash value H', and then generates a pair Q as follows:

$$Q=(H', Cert_X(I_G, K_{PubG})),$$

where $Cert_X(I_G, K_{PubG})$ is the certificate obtained from the certificate authority, and sends Q to the trusted registration authority for registration, wherein the trusted registration authority determines if the certificate $Cert_X(I_G, K_{PubG})$ for the content provider is valid, denies the registration if it is not valid, and, if it is valid, stores the encrypted hash value H' together with $I_G$ and time and date of receipt, and extracts the hash value H from Q as follows:

$$H=D\{K_{PubG}\}[H'],$$

and then generates the registration information in the form of a registration stub Q' as follows:

$$Q'=E\{K_{PrvTRA}\}[H],$$

wherein the content provider receives Q' from the trusted registration authority, and determines if:

$$D\{K_{PubTRA}\}[Q']=hash(M),$$

and if it is, stores Q' and M for subsequent distribution to the content consumer, wherein the content consumer, upon receipt of Q' and M from the content provider, determines if:

$$D\{K_{PubTRA}\}[Q']=hash(M),$$

and if it is, utilizes the content M, and wherein, if content M is determined to be illegal, the source of content M is identifiable by the trusted registration authority.

2. The method as claimed in claim 1, wherein the registration information is distributed by the content provider to the content consumer in conjunction with the content such that the content provider can subsequently be identified by the trusted registration authority from the registration information distributed to the content consumer.

3. The method as claimed in claim 1, wherein the content is distributed by the content provider in encrypted form to the content consumer.

4. The method as claimed in claim 1, wherein the content is distributed by the content provider in unencrypted form to the content consumer.

5. The method as claimed in claim 1, wherein usage rights are bound with the content as part of the registration, such that the usage rights cannot be subsequently altered by at least one of the content provider and the content consumer.

6. The method as claimed in claim 1, wherein usage rights are not bound with the content as part of the registration, such that the usage rights can be subsequently altered by at least one of the content provider and the content consumer.

7. The method as claimed in claim 1, wherein the content comprises digital multimedia information including at least one of audio, video, text, graphics or other forms of information.

8. The method as claimed in claim 1, wherein the content provider receives the registration information from the trusted registration authority, determines the validity of the registration authority, and if the registration authority is valid, stores the content and the registration information for subsequent distribution to the content consumer.

9. The method as claimed in claim 1, wherein the content consumer, upon receipt of the content and registration information from the content provider, determines the validity of the content, and, if the content is valid, utilizes the content.

10. A method of distributing content from a content provider to a content consumer, the method comprising the steps of:

requesting registration of the content by the content provider with a trusted registration authority, the registration of the content with the trusted registration authority being based, at least in part, on a certificate obtained by the content provider from a certification authority;

receiving registration information by the content provider from the trusted registration authority; and distributing, by the content provider, at least a portion of the registration information to the content consumer in conjunction with the content, wherein the content provider encrypts a specific content M to generate encrypted content M' as follows:

$$M'=E\{K_{Cont}\}[M],$$

where $K_{Cont}$ is an encryption key;

wherein the content provider generates a hash value H for the encrypted content M', encrypts H using its private key $K_{PrvG}$ to generate an encrypted hash value H', and then generates a pair Q as follows:

$$Q=(H', Cert_X(I_G, K_{PubG})),$$

where $Cert_X(I_G, K_{PubG})$ is the certificate obtained from the certificate authority, and sends Q to the trusted registration authority for registration;

wherein the trusted registration authority determines if the certificate $Cert_X(I_G, K_{PubG})$ for the content provider is valid, denies the registration if it is not valid, and, if it is valid, stores the encrypted hash value H' together with $I_G$ and time and date of receipt, and extracts the hash value H from Q as follows:

$$H=D\{K_{PubG}\}[H'],$$

and then generates the registration information in the form of a registration stub Q' as follows:

$$Q'=E\{K_{PrvTRA}\}[H],$$

wherein the content provider receives Q' from the trusted registration authority, and determines if:

$$D\{K_{PubTRA}\}[Q']=hash(M'),$$

and if it is, stores Q' and M' for subsequent distribution to the content consumer;

wherein the content consumer, upon receipt of Q' and M' from the content provider, determines if:

$$D\{K_{PubTRA}\}[Q']=hash(M'),$$

and if it is, stores the encrypted content M';

wherein the content consumer receives the content decryption key $K_{Cont}$ as well as any usage rules defined by the content provider, after the content provider verifies the identity of the content consumer; and wherein the content consumer generates a hash value H for the encrypted content M', encrypts H using the private key $K_{PrvC}$:

$$H''=E\{K_{PrvC}\}[H],$$

generates a pair Q" including the encrypted hash value and a certificate $Cert_X(I_C, K_{PubC})$:

$$Q''=(H'', Cert_Y(I_C, K_{PubC})),$$

where $Cert_Y(I_C, K_{PubC})$ is a certificate obtained by the content consumer from a certificate authority, and sends the pair Q" to the content provider.

11. The method as claimed in claim 10, wherein the content provider determines if the certificate $Cert_Y(I_C, K_{PubC})$ of the content consumer is valid, and if it is valid, determines if:

$$D\{K_{PubC}\}[H'']=hash(M'),$$

and if it is, the content provider uses a license key $K_{license}$ to encrypt the content key $K_{Cont}$ and usage rules:

$$A=E\{K_{license}\}[usage\_rules|K_{Cont}],$$

encrypts the license key:

$$B=E\{K_{PubC}\}[K_{license}],$$

generates a license stub L as the pair (A, B), and sends the license stub L to the content consumer.

12. The method as claimed in claim 11, wherein the content consumer decrypts the license key:

$$K_{license}=D\{K_{PrvC}\}[B],$$

decrypts the usage rules and content key:

$$usage\_rules|K_{Cont}D\{K_{license}\}[A],$$

decrypts the encrypted content M':

$$M=D\{K_{Cont}\}[M'],$$

and applies the usage rules to the content M.

13. The method as claimed in claim 12, wherein, if content M is determined to be illegal, the source of content M is identifiable by the trusted registration authority.

14. A method of distributing content from a content provider to a content consumer, the method comprising the steps of:

requesting registration of the content by the content provider with a trusted registration authority, the registration of the content with the trusted registration authority being based, at least in part, on a certificate obtained by the content provider from a certification authority;

receiving registration information by the content provider from the trusted registration authority; and distributing, by the content provider, at least a portion of the registration information to the content consumer in conjunction with the content, wherein the content provider encrypts a specific content M to generate encrypted content M' as follows;

$$M'=E\{K_{Cont}\}[M],$$

where $K_{Cont}$ is an encryption key, and wherein the content provider generates a hash value H1 for the encrypted content M', binds a set of rules to the content key by generating a license registration stub A as follows:

$$A=E\{K_{license}\}[usage\_rules|K_{Cont}],$$

generates a hash value H2 of A, encrypts H1 and H2 using its private key $K_{Prv}$:

$$H'=E\{K_{PrvG}\}[H1|H2],$$

generates Q as follows:

$$Q=(H', Cert_X(I_G, K_{PubG})),$$

and sends a request to the trusted registration authority to register Q.

15. The method as claimed in claim 14, wherein the trusted registration authority determines if the certificate $Cert_X(I_G, K_{PubG})$ for the content provider is valid, denies the registration if it is not valid, and, if it is valid, stores the encrypted hash value H' together with $I_G$ and time and date of receipt, and extracts the hash values H1 and H2 from Q, generates a content registration stub Q1' as follows:

$$Q1=E\{K_{PrvTRA}\}[H1],$$

generates a usage rules registration stub Q2' as follows:

$$Q2'=E\{K_{PrvTRA}\}[H2],$$

and issues the resulting registration stubs Q1' and Q2' to the content provider.

16. The method as claimed in claim 15, wherein the content provider determines if the certificate for the trusted registration authority is valid, if it is valid, determines if:

$$D\{K_{pubTRA}\}[Q1]=hash(M'),$$

and if it is, and stores Q1', Q2' and M' for subsequent distribution to the content consumer.

17. The method as claimed in claim 16, wherein the content consumer determines if the certificate for the trusted registration authority is valid, and if it is, determines if:

$$D\{K_{PubTRA}\}[Q1']=hash(M'),$$

and if it does, stores the encrypted content M'.

18. The method as claimed in claim 17, wherein the content consumer generates a hash value H for the encrypted content M', encrypts H using the private key $K_{PrvC}$:

$$H'=E\{K_{PrvC}\}[H],$$

generates a pair Q" including the encrypted hash value and a certificate $Cert_Y(I_C, K_{PubC})$:

$$Q''=(H'', Cert_Y(I_C, K_{PubC})),$$

and sends the pair Q" to the content provider.

19. The method as claimed in claim 18, wherein the content provider determines if the certificate $Cert_Y(I_C, K_{PubC})$ of the content consumer is valid, and if it is, determines if:

$$D\{K_{PubC}\}[H'']\text{hash}(M'),$$

and if it does, encrypts the license key $K_{license}$ using the public key $K_{PubC}$ of the content consumer:

$$B=E\{K_{PubC}\}[K_{license}],$$

generates a license stub L as the triple (A, B, Q2'), and sends the license stub L to the content consumer.

20. The method as claimed in claim 19, wherein the content consumer, upon receipt of the license stub L, determines if:

$$D\{K_{PubTRA}\}[Q2']=\text{hash}(A),$$

and if it is, decrypts the license key:

$$K_{license}=D\{K_{PrvC}\}[B],$$

decrypts the rules and content key:

$$\text{usage\_rules}|K_{Cont}=D\{K_{license}\}[A],$$

decrypts the encrypted content M':

$$M=D\{K_{Cont}\}[M'],$$

and applies the usage rules to the content M.

21. The method as claimed in claim 20, wherein, if content M is determined to be illegal, the source of content M is identifiable by the trusted registration authority.

* * * * *